United States Patent
Oh et al.

(10) Patent No.: US 11,600,129 B2
(45) Date of Patent: Mar. 7, 2023

(54) ELECTRONIC VOTING SYSTEM AND METHOD BASED ON HOMOGENEOUS CRYPTOGRAPHY

(71) Applicants: IUCF-HYU (Industry-University Cooperation Foundation Hanyang University), Seoul (KR); Kookmin University Industry Academy Cooperation Foundation, Seoul (KR)

(72) Inventors: Hyunok Oh, Seoul (KR); Jiwon Lee, Seoul (KR); Jihye Kim, Seoul (KR)

(73) Assignees: IUCF-HYU (INDUSTRY-UNIVERSITY COOPERATION FOUNDATION HANYANG UNIVERSITY), Seoul (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 176 days.

(21) Appl. No.: 17/203,024

(22) Filed: Mar. 16, 2021

(65) Prior Publication Data
US 2021/0304544 A1    Sep. 30, 2021

(30) Foreign Application Priority Data
Mar. 27, 2020  (KR) .......................... 10-2020-0037314

(51) Int. Cl.
*G07C 13/00* (2006.01)
*H04L 9/06* (2006.01)
(Continued)

(52) U.S. Cl.
CPC ............ *G07C 13/00* (2013.01); *H04L 9/0643* (2013.01); *H04L 9/3218* (2013.01);
(Continued)

(58) Field of Classification Search
CPC ..... G07C 13/00; H04L 9/0643; H04L 9/3218; H04L 9/3263; H04L 9/50; H04L 2209/463
(Continued)

(56) References Cited

U.S. PATENT DOCUMENTS

2019/0051079 A1* 2/2019 Venkataraman ...... H04L 9/3239
2020/0258338 A1* 8/2020 Goswami .............. H04L 9/3247
(Continued)

FOREIGN PATENT DOCUMENTS

KR   10-2020-0008413 A    1/2020

OTHER PUBLICATIONS

Sang-Woo Han et al., "Development of Electronic Voting System Based on Blockchain using Homomorphic Encryption", DBPia, Jan. 2019, pp. 171-174, Korea Institute of Communication Science, Republic of Korea.

*Primary Examiner* — Daniel A Hess
(74) *Attorney, Agent, or Firm* — Novick, Kim & Lee PLLC; Jae Youn Kim (57) ABSTRACT

Disclosed are an electronic voting system based on homogeneous cryptography and a method thereof. An electronic voting method includes the steps of: (a) generating a serial number sn by using election identification information eid and a his/her secret key, wherein the election identification information eid is shared through a block chain; (b) encrypting a voting message M through verifiable homogeneous cryptography to generate a ciphertext CT, and generating a zero-knowledge proof key π for the voting message; and (c) transmitting an electronic ballot including the serial number sn, the ciphertext CT, and the zero-knowledge proof key π to a block chain network as a transaction.

14 Claims, 6 Drawing Sheets

(51) Int. Cl.
*H04L 9/32* (2006.01)
*H04L 9/00* (2022.01)

(52) U.S. Cl.
CPC .............. *H04L 9/3263* (2013.01); *H04L 9/50* (2022.05); *H04L 2209/463* (2013.01)

(58) Field of Classification Search
USPC ........................................................ 235/51
See application file for complete search history.

(56) References Cited

U.S. PATENT DOCUMENTS

2022/0172545 A1* 6/2022 Zbeda ................... H04L 9/0825
2022/0189232 A1* 6/2022 Zbeda ................... H04L 9/0825

\* cited by examiner

GenKey($1^\kappa, ID$):
    $sk \xleftarrow{\$} \{0,1\}^n$
    $sk_{ID} \leftarrow ID \| sk$
    $pk_{ID} = H(sk_{ID})$
    return $sk_{ID}$ to voter
    publish $pk_{ID}$ Vote($CRS, PK_{eid}, eid, rt, pklist, M, pk_{ID}, sk_{ID}$):
    $path \leftarrow GetMerklePath(pk_{ID}, pklist)$
    $sn \leftarrow H(eid \| sk_{ID})$
    $\pi, CT \leftarrow$ SAVER.Enc($CRS, PK_{eid}, M, eid, sn, rt, path, sk_{ID}$)
    send $ballot = \{eid, sn, \pi, CT\}$ to $BlockChain$ network VerifyVote($CRS, \pi'_{ID}, CT'_{ID}, eid, rt$):
    $sn \leftarrow H(eid \| sk_{ID})$
    assert SAVER.Verify_Enc($CRS, \pi'_{ID}, CT'_{ID}, eid, sn, rt$) = true VerifyTally($CRS, PK_{eid}, VK_{eid}, \{CT'_{ID_i}\}_{i=1}^{N}, M_{sum}, \nu$):
    $CT'_{sum} = CT'_{ID_1} \circ \cdots \circ CT'_{ID_N}$
    assert SAVER.Verify_Dec($CRS, PK_{eid}, VK_{eid}, M_{sum}, \nu, CT'_{sum}$) = true

FIG. 3

```
PostVote(CRS, PK_eid, rt, ballot) :
    parse ballot = {eid, sn, π, CT}
    assert sn ∉ BlockChain
    assert SAVER.Verify_Enc(CRS, π, CT, eid, sn, rt) = true
    π', CT' ← SAVER.Rerandomize(PK_eid, π, CT)
    upload (eid, sn, π', CT') on BlockChain
```

FIG. 4 relation($m_1, \ldots, m_n, e, sn, rt; path, sk_{ID}$):
    $pk_{ID} \leftarrow H(sk_{ID})$
    $rt \leftarrow MerkleTree(path, pk_{ID})$
    $sn \leftarrow H(e \parallel sk_{ID})$
    assert $m_i \in \{0, 1\}$ for $i = 1$ to $n$
    assert $\sum_{i=1}^{n} m_i = 1$ InitSystem(relation):
    $CRS \leftarrow$ SAVER.Setup(relation)
    upload $CRS$ on $BlockChain$ Election($CRS, 1^\kappa, \{pk_{ID_i}\}_{i=1}^{N}$):
    $pklist \leftarrow \{pk_{ID_i}\}_{i=1}^{N}$ for total $N$ voters
    $rt \leftarrow GetMerkleRoot(pklist)$
    $eid \xleftarrow{\$} \{0, 1\}^\kappa$
    $SK_{eid}, PK_{eid}, VK_{eid} \leftarrow$ SAVER.KeyGen($CRS$)
    return $SK_{eid}$ to $admin$
    upload $pklist, PK_{eid}, VK_{eid}, eid, rt$ on $BlockChain$ Tally($CRS, SK_{eid}, VK_{eid}, \{CT'_i\}_{i=1}^{N}$):
    $CT'_{sum} = CT'_1 \circ \cdots \circ CT'_N$
    $M_{sum}, \nu \leftarrow$ SAVER.Dec($CRS, SK_{eid}, VK_{eid}, CT'_{sum}$)
    publish ($M_{sum}, \nu$)

ELECTRONIC VOTING SYSTEM AND METHOD BASED ON HOMOGENEOUS CRYPTOGRAPHY

CROSS-REFERENCE TO RELATED APPLICATION

This application claims under 35 U.S.C. § 119(a) the benefit of Korean Patent Application No. 10-2020-0037314 filed on Mar. 27, 2020, the entire contents of which are incorporated herein by reference.

BACKGROUND

(a) Technical Field

The present invention relates to an electronic voting system based on homogeneous cryptography and a method thereof.

(b) Background Art

Since all existing electronic voting systems delegate the privacy of voters and the integrity of the voting result to an administrator with a specific authority, it is difficult to define the system as a safe and transparent system when assuming a corrupt administrator. In particular, in order to fundamentally guarantee the privacy of voters, there is a need for "coercion-resistance" in which the voter cannot reproduce his or her vote so that the voter may cast a voting with confidence even by coercion.

On the other hand, for the integrity of voting result, there is a need for "individual verifiability" that the voter needs to confirm the existence of his or her voting. However, for coercion legitimacy, the voting itself needs to be transformed so that even the voter cannot know, and in that case, the voter can no longer know whether his or her vote exists properly, and the individual verifiability is broken.

Due to a structural opposition between these two attributes, electronic voting systems so far have been designed by mainly focusing on coercion legitimacy, and the individual verifiability is either left to the authority of the administrator or has not been properly preserved.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

An object of the present invention is to provide an electronic voting system based on homogeneous cryptography and a method thereof capable of satisfying coercion-resistance and individual verifiability, thereby making it possible to prevent tampering of a voting process through a block chain.

Further, another object of the present invention is to prove a legitimate voter through the connection with a non-interactive zero-knowledge proof, to prove that a voting message is within a legitimate range, to prevent voting result decrypted and published by the administrator through verifiable decryption and homogeneous cryptography from being tampered, and to guarantee votes of the block chain as the result of counting as it is.

According to an aspect of the present invention, there is provided an electronic voting method using additional homogeneous cryptography and a block chain.

According to an embodiment of the present invention, there is provided an electronic voting method including the steps of: (a) generating a serial number sn by using election identification information eid and a his/her secret key, wherein the election identification information eid is shared through a block chain; (b) encrypting a voting message M through verifiable homogeneous cryptography to generate a ciphertext CT, and generating a zero-knowledge proof key $\pi$ for the voting message; and (c) transmitting an electronic ballot including the serial number sn, the ciphertext CT, and the zero-knowledge proof key $\pi$ to a block chain network as a transaction.

Each of an administrator terminal and the voter terminal receiving the transaction through the block chain network may discard the transaction when the serial number sn is duplicated on the block chain.

The electronic voting method may further include verifying the zero knowledge proof using at least some of the CRS, the ciphertext CT, the zero knowledge proof key $\pi$, the serial number sn, the election identification information, and a Merkle route rt when the serial number sn is not duplicated on the block chain; rerandomizing the ciphertext CT and the zero-knowledge proof key $\pi$ by using a public key; and publishing the rerandomized ciphertext CT', zero-knowledge proof key $\pi'$, and serial number sn on the block chain as a block.

The electronic voting method may further include confirming whether the voting is included by verifying the ciphertext CT' and zero-knowledge proof key $\pi'$ published on the block chain by using the generated serial number sn, after step (c).

Before the step (a), the administrator terminal may generate a list of voters, generate a Merkle route rt using the list of voters, generate election identification information eid, and publish a list of voters pklist, a Merkle root rt, an election public key, an election verification key and election identification information eid on the block chain.

According to another embodiment of the present invention, there is provided an electronic voting method in the administrator terminal including the steps of: receiving an electronic ballot including the serial number, the ciphertext CT, and the zero-knowledge proof key $\pi$ from each voter terminal by means of the administrator terminal, wherein the ciphertext CT is encrypted by homogeneous cryptography; merging the ciphertext CTs received from each of the voter terminals to obtain a merged ciphertext CTsum; and decrypting the merged ciphertext CTsum using a secret key, generating a voting result Msum, and transmitting the generated voting result to each voter terminal through a block chain network along with a decryption proof key.

According to another aspect of the present invention, there is provided an electronic voting system using additional homogeneous cryptography and a block chain.

According to an embodiment of the present invention, there is provided a voter terminal including: a voting encryption unit configured to generate a serial number sn using the election identification information eid and its own secret key, encrypt a voting message M through verifiable homogeneous cryptography to generate a ciphertext CT, and generate a zero-knowledge proof key $\pi$ for the voting message M, wherein the election identification information eid is pre-shared through a block chain; and a communication unit configured to transmit an electronic ballot including the serial number sn, the ciphertext CT, and the zero-knowledge proof key π to a block chain network as a transaction.

Each of block chain nodes receiving the transaction through the block chain network may discard the transaction when the serial number sn is duplicated on the block chain, and the block chain nodes may be a plurality of voters and an administrator participating in the election Each of the administrator terminal and the voter terminals receiving the transaction through the block chain network may verify the zero knowledge proof using at least some of the CRS, the ciphertext CT, the zero knowledge proof key π, the serial number sn, the election identification information, and a Merkle route rt, when the serial number sn is not duplicated on the block chain, and rerandomize the ciphertext CT and the zero-knowledge proof key π using a public key, and adds the rerandomized ciphertext CT', zero-knowledge proof key π', and serial number sn on the block chain as a block.

The voter terminal may further include a voting verification unit configured to confirm whether the voting of the voter is included by verifying the ciphertext CT' and zero-knowledge proof key π' published on the block chain by using the generated serial number sn.

The administrator terminal may generate a list of voters, generate a Merkle route rt using the list of voters, generate election identification information eid, and publish a list of voters pklist, a Merkle root rt, an election public key, an election verification key and election identification information eid on the block chain.

According to another embodiment of the present invention, there is provided an electronic voting system including: a voter terminal configured to generate a serial number sn, encrypt a voting message M through verifiable homogeneous cryptography to generate a ciphertext CT, generate a zero-knowledge proof key π for the voting message M, and transmit an electronic ballot including the serial number sn, the ciphertext CT, and the zero-knowledge proof key π to a block chain network; and an administrator terminal configured to verify the zero knowledge proof using at least some of the CRS, the ciphertext CT, the zero knowledge proof key π, the serial number sn, the election identification information, and a Merkle route rt, when the serial number sn is not duplicated on the block chain, rerandomize the ciphertext CT and the zero-knowledge proof key π using a public key, and add the rerandomized ciphertext CT', zero-knowledge proof key π', and serial number sn on the block chain as a block.

It should be understood that the effects of the present invention are not limited to the effects described above, but include all effects that can be deduced from the detailed description of the present invention or configurations of the invention described in appended claims.

DETAILED DESCRIPTION

A singular form used in this specification may include a plural form if there is no clearly opposite meaning in the context. In this specification, the term such as "comprising" or "including" should not be interpreted as necessarily including all various components or various steps disclosed in the specification, and it should be interpreted that some component or some steps among them may not be included or additional components or steps may be further included. In addition, terms including "unit", "module", and the like disclosed in the specification mean a unit that processes at least one function or operation and this may be implemented by hardware or software or a combination of hardware and software.

Hereinafter, embodiments of the present invention will be described in detail with reference to the accompanying drawings.

Figure 1:
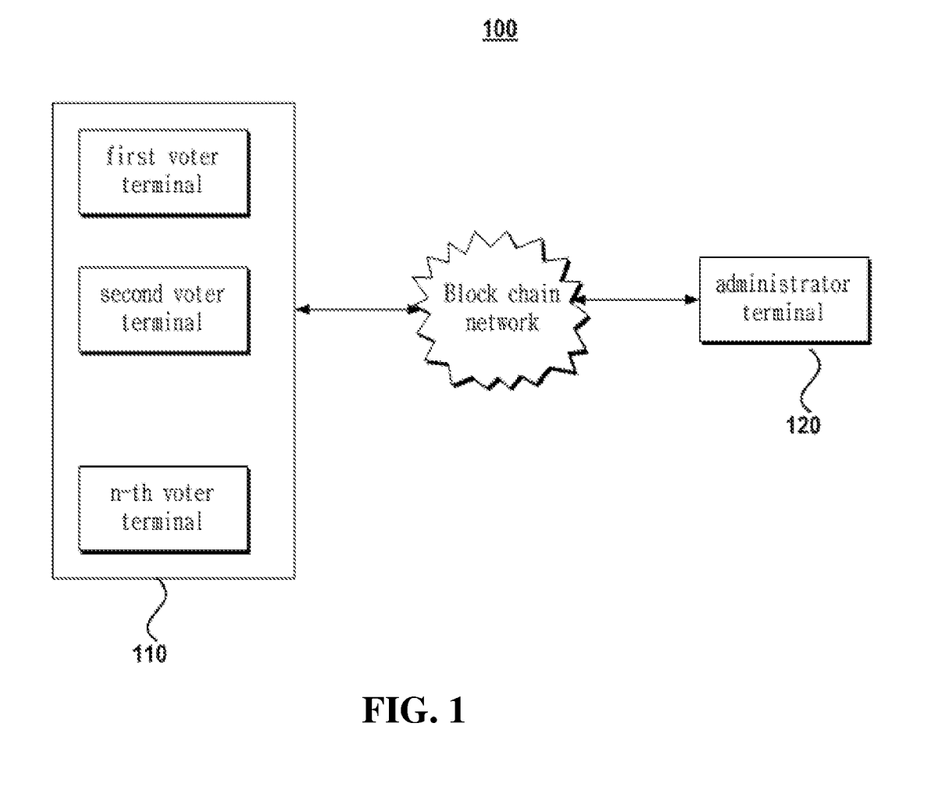
FIG. 1 is a diagram illustrating a configuration of an electronic voting system according to an embodiment of the present invention.

FIG. 1 is a diagram illustrating a configuration of an electronic voting system according to an embodiment of the present invention. Homogeneous cryptography according to an embodiment of the present invention is a verifiable encryption with many useful functions. Here, the useful functions may be zk-SNARK connectivity, additional homogeneity, rerandomization possibility, and verifiable decryption.

In an embodiment of the present invention, an electronic voting system using verifiable homogeneous cryptography will be described.

Referring to FIG. 1, an electronic voting system according to an embodiment of the present invention includes a plurality of voter terminals 110 and an administrator terminal 120.

In addition, it is assumed that the voter terminals 110 and the administrator terminal 120 are connected to each other via a block chain network, and this will be mainly described. Therefore, in the following description, a block chain node should be interpreted as referring to the voter terminal 110 and the administrator terminal 120 included in the block chain network.

An electronic voting method according to an embodiment of the present invention may be designed to satisfy the following required attributes.

Non-malleability: An overall system needs to satisfy non-malleability. That is, the system needs to satisfy non-malleability so that the administrator cannot manipulate results.

Coercion-resistance: Voters need to be able to vote as they intended, despite appearing to be cooperating with a coercer. This means receipt-freeness and ballot-secrecy, which encapsulates the privacy of the entire vote.

Eligibility verifiability: Watchers (observers) need to be able to verify whether to be voted by a legitimate voter.

Individual verifiability: Voters need to be able to verify whether their votes are included in the results.

Universal verifiability: The watcher (observer) needs to be able to verify whether the results are accurately counted from the total vote.

In order to satisfy the above-described attributes, in an embodiment of the present invention, homogeneous cryptography specialized for a block chain and a zero-knowledge proof has been applied. Homogeneous cryptography specialized for the zero-knowledge proof is as described below, and the voter terminals 110 and the administrator terminal 120 may encrypt and decrypt a voting message M according to the homogeneous cryptography specialized for the zero-knowledge proof, respectively.

First, the voter terminal 110 is a device possessed by the voter, and may be an electronic device equipped with a communication function such as, for example, a computer, a notebook computer, and a mobile communication terminal.

The voter terminal 110 may encrypt the voting message M based on verifiable homogeneous cryptography to generate a ciphertext CT, generate a zero-knowledge proof key $\pi$ for the voting message M, and then transmit a ballot including the zero-knowledge proof key to the block chain network as a transaction.

The ballot may include a serial number sn generated by the voter terminal 110. Here, sn may be used to confirm duplicate voting without revealing the identity of the voter.

In an embodiment of the present invention, in order to satisfy the above-described required attributes, this problem may be solved through ciphertext updating and verifiable cryptography.

Ciphertext verification using verifiable cryptography makes it possible to confirm that an existing plaintext is well hidden in the ciphertext according to the attributes. In addition, the ciphertext updating is a method in which the plaintext hidden in the ciphertext is maintained as it is and only a random value is newly updated to become a new type of ciphertext.

For example, if a third party (e.g., a block chain node) transforms an encrypted voting into a new ciphertext by updating the ciphertext, the voter does not know the new random value used for the renewal, so that the voting cannot be reproduced to satisfy coercion-resistance.

However, according to an embodiment of the present invention, the voters cannot reproduce the voting, but may perform ciphertext verification on the updated ciphertext. If the ciphertext verification is passed, it means that the plaintext originally intended by the voter is still hidden by satisfying the attributes of the voting, so that individual verifiability may be satisfied.

In an embodiment of the present invention, a block chain is used to satisfy non-malleability.

The block chain may be used to prevent manipulation of the voting process because it is difficult to modify a generated block.

In addition, in an embodiment of the present invention, the zero-knowledge proof is used to prove affiliation to prove that the voter is a legitimate voter included in the list of voters, and may be used to prove that the voting message is within a legitimate range (for example, in the case of a presidential election, only 1 candidate has 1 vote).

The administrator terminal 120 is a device possessed by a subject opening an election, and for example, may be an electronic device with a communication function, such as a computer, a notebook computer, etc. In addition, a subject of the administrator terminal 120 may be a subject that supervises the election, such as the National Election Commission. However, the administrator terminal is not necessarily limited thereto, and may be a specific administrator entrusted to establish an election by the National Election Commission or the like. Hereinafter, the description will be collectively referred to as the administrator, but the subject of the administrator terminal 120 should be understood as a subject who manages an election or has been delegated overall management thereto other than the voters.

The administrator terminal 120 is a device for improving elections, collecting the encrypted ballots from each voter terminal 110 and then counting the voting result.

The voting message of each voter is encrypted through verifiable homogeneous cryptography, and the encrypted voting message and zero-knowledge proof key may be re-randomized when each added to the block chain.

In addition, according to the electronic voting system according to an embodiment of the present invention, the voting message is encrypted through the verifiable homogeneous cryptography and then transmitted through the block chain network as a transaction, so that manipulation of voting and voting count is impossible.

Accordingly, the administrator terminal 120 may decrypt the encrypted ballot and check whether the vote is made by a legitimate voter, but is connected through zero-knowledge proof so as not to confirm/identify the identity of the voter.

In summary, the administrator terminal 120 according to an embodiment of the present invention may decrypt the electronic ballots and inspect the results of the ongoing election.

It is assumed that there is a c administrator. Each administrator $AD_i$ may select randomly $\rho_i$ through KeyGen. Each $AD_i$ publishes $VK_i$ on the basis of $\rho_i$ instead of a decryption key $\rho$. $VK_i$ is $\Pi_{i=1}^{c} VK_i$. Each $AD_i$ publishes $v_i = (\Pi_{j=p}^{q} c_{i,0})^{\rho_i}$. By combining $v_i$, everyone may calculate $v = \Pi_{i=1}^{c} v_i$. The plaintext may be decrypted from the combined ciphertext by using $v$.

Hereinafter, an electronic voting scenario will be described in more detail with reference to FIG. 2.

Figure 2:
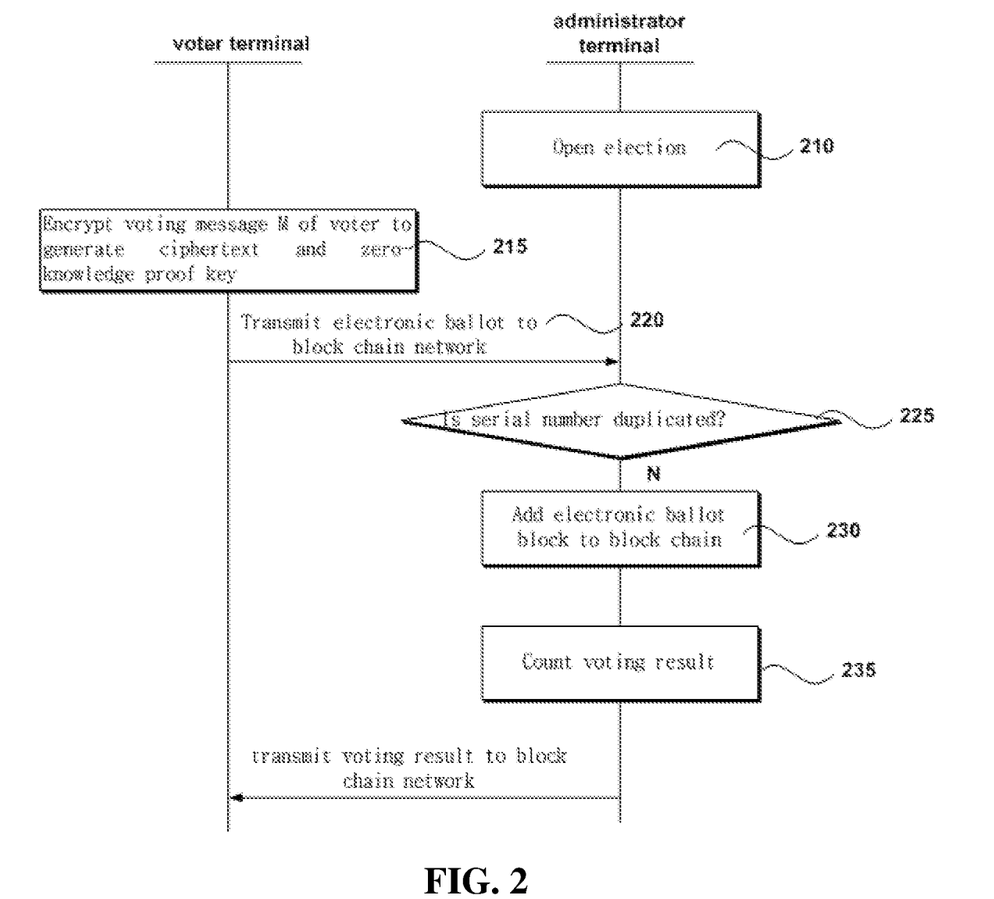
FIG. 2 is a flowchart illustrating an electronic voting method according to an embodiment of the present invention.
Figure 3:
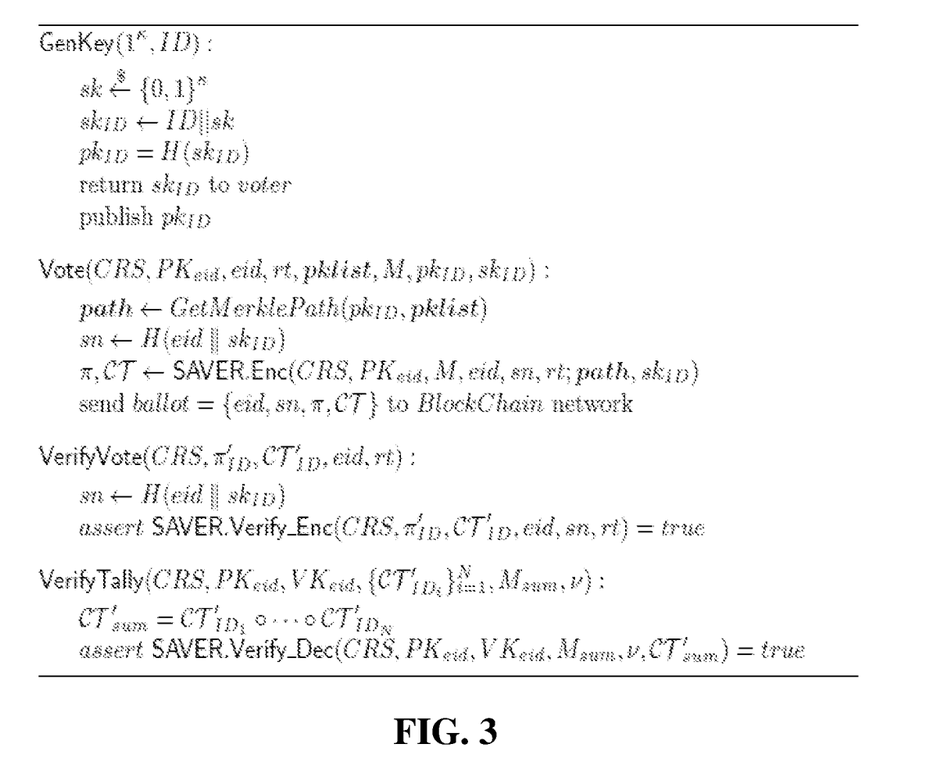
FIG. 3 is a diagram illustrating pseudo codes for an electronic voting method of an administrator terminal according to an embodiment of the present invention.
Figure 4:
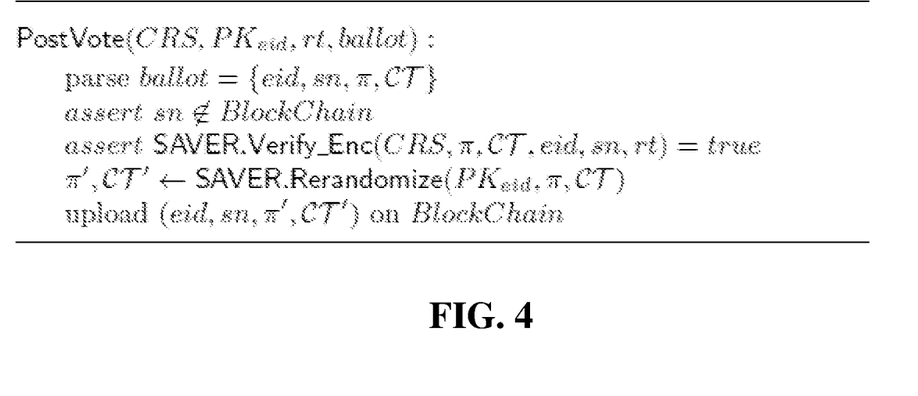
FIG. 4 is a diagram illustrating pseudo codes for an electronic voting method of a black chain node according to an embodiment of the present invention.
Figure 5:
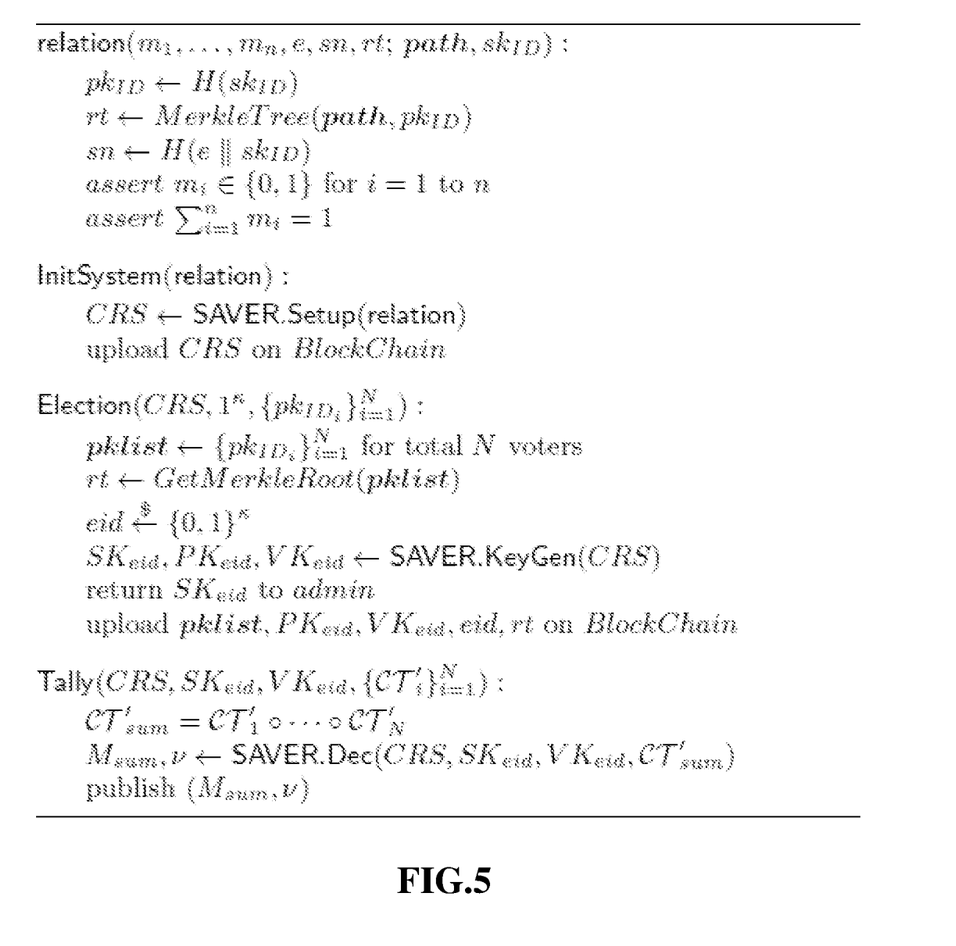
FIG. 5 is a diagram illustrating pseudo codes for an electronic voting method of an administrator terminal according to an embodiment of the present invention.

FIG. 2 is a flowchart illustrating an electronic voting method according to an embodiment of the present invention, FIG. 3 is a diagram illustrating pseudo codes for an electronic voting method of a administrator terminal according to an embodiment of the present invention, FIG. 4 is a diagram illustrating pseudo codes for an electronic voting method of a black chain node according to an embodiment of the present invention, and FIG. 5 is a diagram illustrating pseudo codes for an electronic voting method of a administrator terminal according to an embodiment of the present invention.

In step S210, the administrator terminal 120 opens an election.

For example, the administrator terminal 120 may open an election after providing identification information eid for identifying individual election.

An initialization process may proceed before opening the election.

In the initialization process, first, a common reference string (CRS) may be generated by using a relation R of zero-knowledge proof. Here, the CRS may be generated by a trusted 3rd party other than the administrator terminal 120 or may be generated by agreement.

In addition, during the initialization process, all voters participating in the electronic voting may generate a secret key skip and a public key $pk_{ID}$ using identification information ID of each voter. Here, the public key $pk_{ID}$ may be generated by applying the secret key $sk_{ID}$ to a collision prevention hash function. In the electronic voting system according to an embodiment of the present invention, the public key $pk_{ID}$ may be published to all voters participating in a block chain network through a block chain. Without knowing the secret key, no one can cast a valid vote.

Of course, the administrator terminal 120 may also generate a secret key SK, a public key PK, and a verification key VK by using the CRS.

Before opening an election, the administrator terminal 120 may generate a list of voters who will participate in voting in the corresponding election and then open an election. In addition, the administrator terminal 120 may post a public key PK, a verification key VK, a list of voters pklikst, and a Merkle root rt on the block chain network.

In addition, for each election, the public key PK, the verification key VK, and the list of voters pklist may be newly generated.

In step S215, the voter terminal 110 encrypts the voting message M of the voter through homogeneous cryptography to generate a ciphertext CT, and generates a zero-knowledge proof key $\pi$ for the voting message M.

In more detail, the voter terminal 110 generates a Merkle root rt for proving whether the corresponding voter is included in the voter list, and generates a serial number sn to prevent duplicate voting.

According to an embodiment of the present invention, zn-SNARK may be used to prove whether the voter is a legitimate voter. That is, in an embodiment of the present invention, it can be verified whether or not the voter is included in the list of voters using a Merkle hash tree.

For the pre-calculated Merkle root of the public key, the prover (each voter) may generate a Merkle root value of a co-path with a secret key corresponding to the public key. Accordingly, the voter terminal 110 may prove that the voter is a legitimate voter in a public key list without exposing the secret key, and the administrator may check whether or not the voter is qualified. Since the Merkle hash tree algorithm itself is well known to those skilled in the art, a detailed description thereof will be omitted.

In addition, the voter terminal 110 may generate the serial number sn by applying the secret key and election identification information eid of the corresponding voter to a hash function. The generated serial number sn is published through the block chain, thereby preventing duplicate voting by the same voter.

The voter terminal 110 may encrypt the voting message M through verifiable homogeneous cryptography to generate a ciphertext CT, and generate a zero-knowledge proof key for the voting message M. A detailed algorithm thereof will be described in detail below.

In step S220, the voter terminal 110 transmits an electronic ballot including the serial number sn, the ciphertext CT, and the zero-knowledge proof key as a transaction through the block chain network.

As already described above, a plurality of voter terminals 110 and the administrator terminal 120 are connected to each other through the block chain. Therefore, when the electronic ballot is transmitted as a transaction by each voter terminal 110, the voter terminals and the administrator terminal participating in the corresponding election verify the transaction transmitted through the block chain network and may perform an operation of adding the verified transaction to the block chain.

Hereinafter, for convenience of description, it has been described that the administrator terminal verifies the transaction on behalf of the block chain nodes to add a block to the block chain, but it should be extended and interpreted as that the same process is performed at each voter terminal.

In step S225, the administrator terminal 120 determines whether the serial number sn included in the electronic ballot is duplicated.

If the serial number sn is duplicated, the administrator terminal 120 discards the corresponding transaction.

However, if the serial number sn is not duplicated, in step S230, the administrator terminal 120 rerandomizes the ciphertext CT and the zero-knowledge proof key included in the electronic ballot, and then adds the serial number sn and the rerandomized ciphertext and zero-knowledge proof key to the block chain as blocks.

For example, the administrator terminal 120 verifies the zero knowledge proof using at least some of the CRS, the ciphertext CT, the zero knowledge proof key $\pi$, the serial number sn, the election identification information, and the Merkle route rt, and may rerandomize the ciphertext CT and the zero-knowledge proof key $\pi$ by using the public key when the verification is completed. Subsequently, the administrator terminal 120 may add a rerandomized ciphertext CT', a zero-knowledge proof key $\pi$', and a serial number sn to the block chain as a block.

After voting of all voters is initiated on the block chain, in step S235, the administrator terminal 120 collects the voting result and then transmits the collected voting result through the block chain network.

According to an embodiment of the present invention, since the ciphertext CT for the voting message M is encrypted by homogeneous cryptography, a sum CTsum of the combined ciphertext may be obtained. Accordingly, the administrator terminal 120 may decrypt the ciphertext CTsum combined with the secret key of the administrator terminal and transmit a voting result Msum together with a decryption verification key v through the block chain network.

By verifying the Msum using the decryption verification key, the voter may assure that the voting count is accurately performed.

FIG. 3 illustrates pseudo codes for an electronic voting method performed in each voter terminal of the electronic voting system, FIG. 4 illustrates pseudo codes for an electronic voting method performed in the block chain node, and FIG. 5 illustrates pseudo codes for an electronic voting method performed in the administrator terminal.

Figure 6:
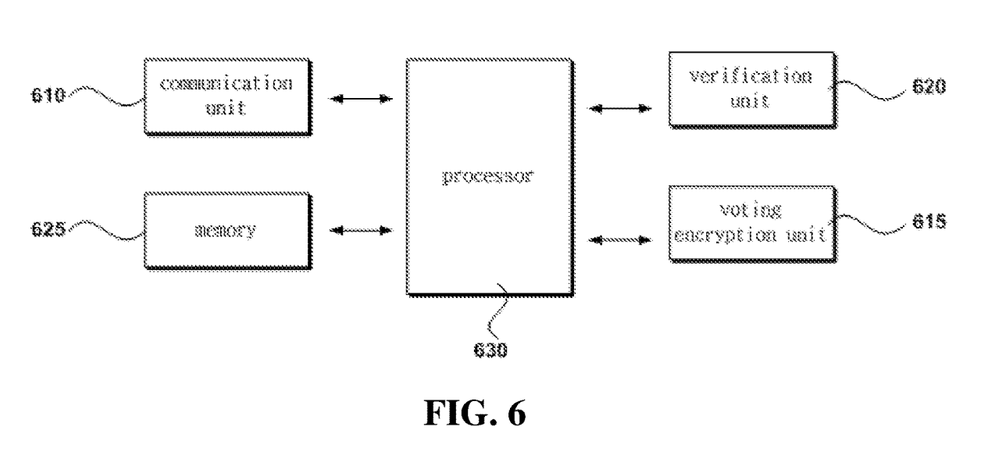
FIG. 6 is a block diagram schematically illustrating an internal configuration of a voter terminal according to an embodiment of the present invention.

FIG. 6 is a block diagram schematically illustrating an internal configuration of a voter terminal according to an embodiment of the present invention.

Referring to FIG. 6, the voter terminal 110 according to an embodiment of the present invention includes a communication unit 610, a voting encryption unit 615, a verification unit 620, a memory 625, and a processor 630.

The communication unit 910 is a means which is connected to other voter terminals and the administrator terminal participating in the election through a block chain to transmit or receive a transaction.

For example, the communication unit 910 may transmit an electronic ballot including the serial number sn, the ciphertext CT, and the zero-knowledge proof key $\pi$ as a transaction to the block chain network.

The voting encryption unit 615 may generate a serial number sn using the election identification information eid and its own secret key, encrypt a voting message M through a verifiable homogeneous cryptography to generate a ciphertext CT, and generate a zero-knowledge proof key $\pi$ for the voting message M.

This is as described in detail with reference to FIGS. 1 and 2, and the method for additional homogeneous cryptography of the voting message M is the same as the detailed algorithm described in FIGS. 6 to 8.

The verification unit 620 is a means for verifying the own electronic ballot that has been published through the block chain.

The memory 625 is a means for storing instructions (program codes) required for performing an electronic voting method based on additional homogeneous cryptography and a block chain.

The processor 630 is a means for controlling internal components of the voter terminal 110 according to an embodiment of the present invention (for example, the communication unit 910, the voting encryption unit 615, the verification unit 620, and the memory 625. etc.). In addition, the voter terminal 110 may further include a configuration such as the voting verification unit and the like for verifying the voting result.

Hereinabove, the present invention has been described with reference to the embodiments thereof. It is understood to those skilled in the art that the present invention may be implemented as a modified form without departing from an essential characteristic of the present invention. Therefore, the disclosed embodiments should be considered in an illustrative viewpoint rather than a restrictive viewpoint. The scope of the present invention is defined by the appended claims rather than by the foregoing description, and all differences within the scope of equivalents thereof should be construed as being included in the present invention.

What is claimed is:

1. An electronic voting method in a voter terminal, the electronic voting method comprising:
   (a) generating a serial number sn by using election identification information eid and a his/her secret key, wherein the election identification information eid is shared through a block chain;
   (b) encrypting a voting message M through verifiable homogeneous cryptography to generate a ciphertext CT, and generating a zero-knowledge proof key $\pi$ for the voting message; and
   (c) transmitting an electronic ballot including the serial number sn, the ciphertext CT, and the zero-knowledge proof key $\pi$ to a block chain network as a transaction.

2. The electronic voting method of claim 1, wherein each of an administrator terminal and the voter terminal receiving the transaction through the block chain network discards the transaction when the serial number sn is duplicated on the block chain.

3. The electronic voting method of claim 2, further comprising:
   verifying the zero knowledge proof using at least some of the CRS, the ciphertext CT, the zero knowledge proof key $\pi$, the serial number sn, the election identification information, and a Merkle route rt when the serial number sn is not duplicated on the block chain;
   rerandomizing the ciphertext CT and the zero-knowledge proof key $\pi$ by using a public key; and
   publishing the rerandomized ciphertext CT', zero-knowledge proof key $\pi$', and serial number sn on the block chain as a block.

4. The electronic voting method of claim 3, further comprising:
   confirming whether the voting is included by verifying the ciphertext CT' and zero-knowledge proof key $\pi$' published on the block chain by using the generated serial number sn, after step (c).

5. The electronic voting method of claim 1, wherein before the step (a), the administrator terminal generates a list of voters, generates a Merkle route rt using the list of voters, generates election identification information eid, and
   publishes a list of voters pklist, a Merkle root rt, an election public key, an election verification key and election identification information eid on the block chain.

6. The electronic voting method of claim 1, further comprising:
   receiving an electronic ballot including the serial number, the ciphertext CT, and the zero-knowledge proof key $\pi$ from each voter terminal by means of the administrator terminal, after step (c), wherein the ciphertext CT is encrypted by homogeneous cryptography;
   merging the ciphertext CTs received from each of the voter terminals to obtain a merged ciphertext CTsum; and
   decrypting the merged ciphertext CTsum using a secret key, generating a voting result Msum, and transmitting the generated voting result to each voter terminal through a block chain network along with a decryption proof key.

7. A voter terminal comprising:
   a voting encryption unit configured to generate a serial number sn using the election identification information eid and its own secret key, encrypt a voting message M through verifiable homogeneous cryptography to generate a ciphertext CT, and generate a zero-knowledge proof key $\pi$ for the voting message M, wherein the election identification information eid is pre-shared through a block chain; and
   a communication unit configured to transmit an electronic ballot including the serial number sn, the ciphertext CT, and the zero-knowledge proof key $\pi$ to a block chain network as a transaction.

8. The voter terminal of claim 7, wherein each of block chain nodes receiving the transaction through the block chain network discards the transaction when the serial number sn is duplicated on the block chain, and
   the block chain nodes are a plurality of voters and an administrator participating in the election.

9. The voter terminal of claim 8, wherein each of the administrator terminal and the voter terminals receiving the transaction through the block chain network verifies the zero knowledge proof using at least some of the CRS, the ciphertext CT, the zero knowledge proof key $\pi$, the serial number sn, the election identification information, and a Merkle route rt, when the serial number sn is not duplicated on the block chain, and
   rerandomizes the ciphertext CT and the zero-knowledge proof key $\pi$ using a public key, and adds the rerandomized ciphertext CT', zero-knowledge proof key $\pi$', and serial number sn on the block chain as a block.

10. The voter terminal of claim 9, further comprising:
    a voting verification unit configured to confirm whether the voting of the voter is included by verifying the ciphertext CT' and zero-knowledge proof key $\pi$' published on the block chain by using the generated serial number sn.

11. The voter terminal of claim 7, wherein the administrator terminal generates a list of voters, generates a Merkle route rt using the list of voters, generates election identification information eid, and
    publishes a list of voters pklist, a Merkle root rt, an election public key, an election verification key and election identification information eid on the block chain.

12. An electronic voting system comprising:
a voter terminal configured to generate a serial number sn, encrypt a voting message M through verifiable homogeneous cryptography to generate a ciphertext CT, generate a zero-knowledge proof key $\pi$ for the voting message M, and transmit an electronic ballot including the serial number sn, the ciphertext CT, and the zero-knowledge proof key $\pi$ to a block chain network; and
an administrator terminal configured to verify the zero knowledge proof using at least some of the CRS, the ciphertext CT, the zero knowledge proof key $\pi$, the serial number sn, the election identification information, and a Merkle route rt, when the serial number sn is not duplicated on the block chain, rerandomize the ciphertext CT and the zero-knowledge proof key $\pi$ using a public key, and add the rerandomized ciphertext CT', zero-knowledge proof key $\pi$', and serial number sn on the block chain as a block.

13. The electronic voting system of claim 12, wherein the administrator terminal decrypts the rerandomized ciphertext CT' using a secret key, collects a voting result, and then transmits the collected voting result to the voter terminal through the block chain network.

14. The electronic voting system of claim 12, wherein the voter terminal confirms whether the voting of the voter is included by verifying the ciphertext CT' and zero-knowledge proof key $\pi$' published on the block chain by using the generated serial number sn.

* * * * *